Aug. 18, 1931.  F. G. THWAITS  1,819,827
SANITARY VENT FOR PRESSURE MILK TANKS
Filed June 24, 1929
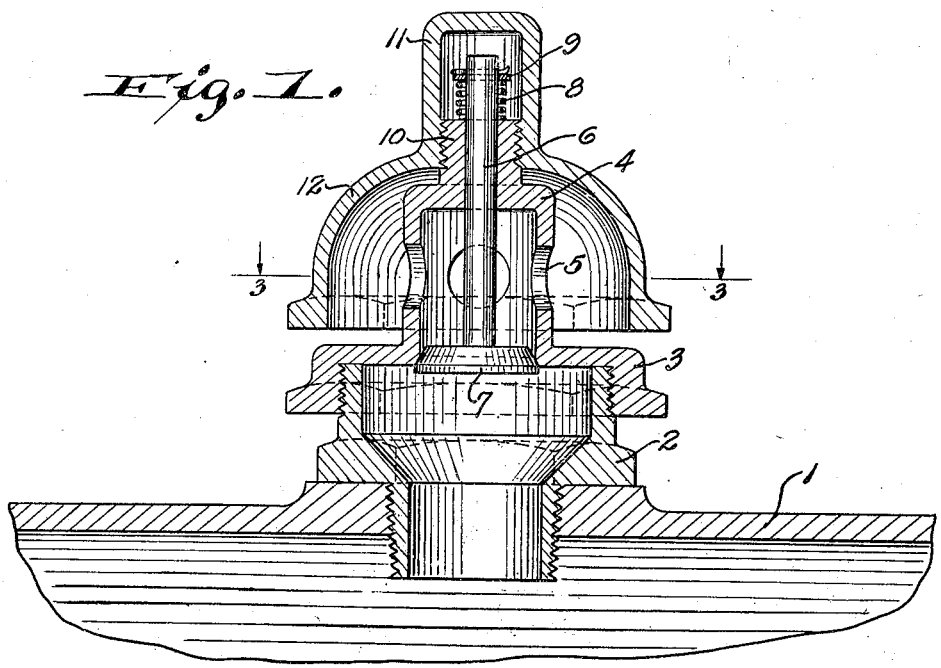
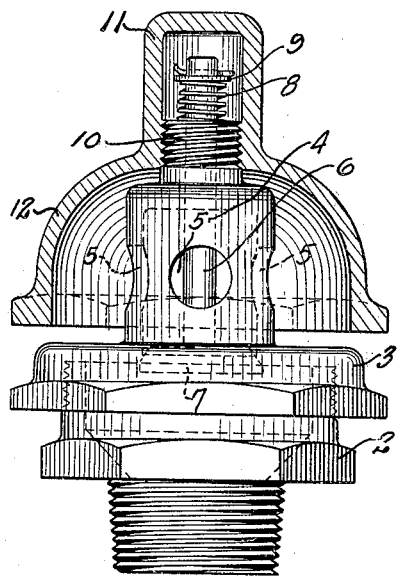
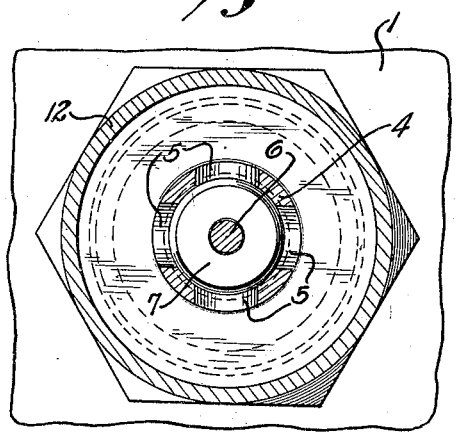
INVENTOR.
Frederick G. Thwaits
BY
Morsell, Keeney & Morsell
ATTORNEYS.

Patented Aug. 18, 1931

1,819,827

UNITED STATES PATENT OFFICE

FREDERICK G. THWAITS, OF WAUWATOSA, WISCONSIN, ASSIGNOR TO THE HEIL CO., OF MILWAUKEE, WISCONSIN, A CORPORATION OF WISCONSIN

SANITARY VENT FOR PRESSURE MILK TANKS

Application filed June 24, 1929. Serial No. 373,175.

This invention provides a simple and inexpensive air-vent for tanks, particularly that class of tanks mounted on trucks and used for transporting milk in bulk. The present vent device is especially intended for that type of tank in which the milk is expelled from the tank by means of air or other fluid pressure maintained within the tank, on top of the body of milk.

Referring to the drawings annexed—

Fig. 1 is a vertical sectional view of my improved vent;

Fig. 2 is a view partly in section and partly in vertical section;

Fig. 3 is a horizontal sectional view on the line 3—3 of Fig. 1.

Referring to the drawings annexed by reference-numerals, 1 is the top-wall of the milk-tank; 2 is a cylindrical valve-casing screwed into a threaded hole in said top-wall and provided with a cover-plate 3 which is screwed onto the upper end of the valve-casing, this cover being provided with a hole in its center and an upstanding tube 4 provided with lateral air-passages 5 and having its upper end closed.

Working through a hole in the top-wall of the tube 4 is a valve-stem 6 which carries at its lower end a beveled valve-disk 7 which fits up against a seat formed around the central hole in the cover 3, a coil-spring 8 being employed to hold this valve up against said seat, said coil-spring surrounding the upper projecting end of the valve-stem 6 and being maintained in a more or less compressed state by means of a washer 9 held in place by a pin carried by the stem. A threaded upstanding nipple 10 is formed on the top-wall of the tube 4, and onto this nipple is screwed a cap 11 which entirely encloses the spring 8 and is provided with a circular shield or hood 12 which depends near enough to the top surface of the cover 3 to shield the air-passages 5 against the entrance of dust, rain or snow.

It will be observed that in operation the air-vent in the tank, above the milk therein, holds valve 7 to its seat and thus prevents escape of air through the vent while the pressure is on. It will be observed also that, even should the tank tilt or upset, the valve will remain closed. It will be observed also that the valve is free to open inwardly should a vacuum be caused in the tank 1 by either drawing off the milk when there is no pressure in the tank or in draining off water that may be used for washing the interior of the tank. To permit this free inward opening of the valve, I make the spring 8 strong enough only to hold the valve closed against its own weight. It will be observed also that the parts of this vent are readily separable, to permit frequent cleaning of the parts.

What is claimed as new is:

1. A vent for tanks consisting of a valve-casing attached to the tank-wall and having its outer-end closed by a plate having a central hole, said plate being provided with an upstanding central tube having its upper-end closed and provided with a lateral air-passage, a valve-seat being provided around the hole in said plate, an inwardly-working disk-valve within said valve-chamber and adapted to seat against the aforesaid seat a cap member positioned above the tube and extending downwardly around the lateral openings, and an expansible spring enclosed by the cap member and connected to the upper-end of the stem of said valve for normally holding the valve against said seat.

2. A vent device for tanks embodying a valve-casing secured to the wall of the tank, a cover for the outer-end of this valve-casing having a central hole provided with a valve-seat, said cover being provided with an upstanding central tube having an air-passage, a valve in the casing and a light spring for normally holding said valve to its seat, and a cap screwed removably to the upper-end of said tube and covering the spring and provided with a depending apron or hood adapted to shield said air-passage.

3. A vent device for tanks embodying a valve-casing secured to the tank, a cover for the outer-end of said valve-casing having a hole provided with a valve-seat and a lateral opening connected to said valve casing hole, an inwardly-working valve and a spring for normally holding said valve against said seat, and a cap member positioned above the tube and extending downwardly around said lateral opening, said spring being strong enough to hold said valve against gravitational opening but not strong enough to hold the valve open against the vacuum suction created by draining the tank while not under pressure.

4. A vent for a tank having a threaded opening, comprising a valve casing threaded into the opening and having an upper open end, a plate member threaded on the open end portion and having an upstanding tubular portion provided with a lateral air passage, the lower end of the tubular portion having a valve seat formed therein, a valve lightly closing said seat and opening downwardly towards the tank and having a stem which extends through the upper end of the tubular portion, a light coiled spring surrounding the extending stem portion and interposed between the upper end portion of the tubular part and a holding means on the valved stem, and a cap removably threaded on the tubular portion and extending in spaced relation around the lower portion of said tubular member.

5. A vent for a tank, comprising a valve casing having upper and lower threaded end portions, a plate member threaded on the upper end portion of the casing and having an upstanding tubular portion provided with lateral air passages, a downwardly opening valve closing the lower end of the tubular portion, a light spring normally holding the valve on its seat, and a cap extending in spaced relation around the tubular portion of the plate member and the air passages thereof.

In testimony whereof, I affix my signature.

FREDERICK G. THWAITS.